EUGENE C. LETTER
PHILIP J. SULLIVAN
INVENTORS

BY *Frank C. Parker*
*David Woodcock*
ATTORNEYS

United States Patent Office 3,551,304
Patented Dec. 29, 1970

3,551,304
METHOD FOR PRODUCING A COMPOSITE ARTICLE
Eugene C. Letter, Penfield, and Philip J. Sullivan, East Rochester, N.Y., assignors to Bausch & Lomb Incorporated, Rochester, N.Y., a corporation of New York
Filed July 12, 1965, Ser. No. 471,150
Int. Cl. C23b 5/48, 5/60; C23f 17/00
U.S. Cl. 204—38
9 Claims

ABSTRACT OF THE DISCLOSURE

A method for making a composite article comprising coating a glass substrate with a thin conducting coating and reducing portions of the coating to form opaque areas. The method is used to produce reticles or circuits on a glass substrate.

---

The present invention relates to a method for producing a composite article, and more particularly to a method for producing an opaque metallic film on a transparent substrate.

The manufacture of reticles often requires the production of predetermined shapes or indicia onto a transparent substrate such as glass. The predetermined shapes often have unusual configurations. Reticles should be durable and have accurately controlled dimensions, notwithstanding any unusual shapes. It is also desirable to form improved glass to metal seals, and particularly so, when the shape of the article produces a problem with respect to obtaining a uniform seal. Circuitry is often produced on a dielectric substrate such as glass and should have uniform thicknesses and dimensions. Circuitry such as that used for solid state devices or micro-miniature systems should also be accurately controlled and resist a relatively large degree of physical abrasion.

It has now been found that an improved method for producing composite articles offers numerous advantages. For example, advantages are obtained in the manufacturing fields relating to reticles, circuits and other fields requiring metal to ceramic seals. The device may be readily produced at a relatively low cost while maintaining accurately controlled dimensions. Additionally the devices are relatively durable and may be readily and accurately reproduced.

Briefly, the methods according to the present invention comprise the steps of providing a transparent substrate such as glass and coating a surface of the substrate with a transparent conducting metallic oxide layer. The coated substrate is placed in an electrolytic solution and exposed to a current density. The exposed areas of the metallic oxide coating are reduced to a metal to thereby form an opaque layer. A masking technique may also be employed to produce accurately controlled dimensions.

According to a preferred embodiment of the invention the metallic oxide comprises a semiconductive material such as tin oxide. The properties of this material as well as its application in the present invention may be better understood by referring to Chapter 17 "Semiconductive Electrode" in the book "Semiconductors," edited by N. B. Hannoy.

Figure 1:
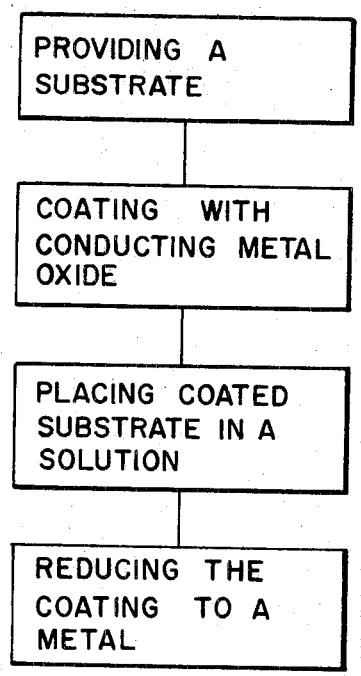
Figure 2:
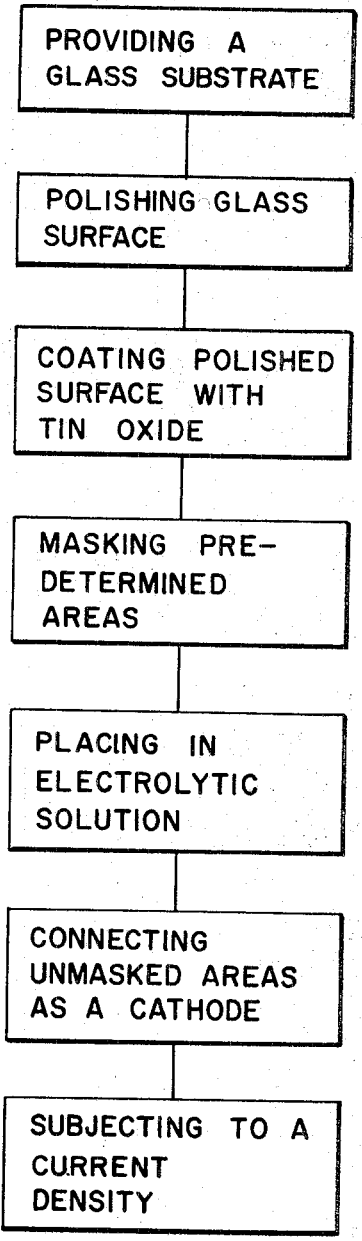

The invention will now be described in connection with the accompanying drawings, in which:

FIG. 1 is a block diagram illustrating a process for forming a composite article according to the invention; and FIG. 2 is a block diagram showing a process according to the preferred embodiment of the invention.

A transparent conducting coating is applied to a transparent substrate. Preferably, the substrate comprises a lime glass having a softening temperature approximately equal to 690° C. The substrate may be approximately 1/8" thick and has polishing surface.

The polished surface is cleaned with laboratory detergent, rinsed with alcohol, air dried and etched. The etching step comprises immersing the surface for at least one minute in an etching solution. The preferred solution comprises 1.5 volumes concentrated hydrofluoric acid, three volumes concentrated sulphuric acid and .9 volume of water. The etched surface is rinsed with distilled water, and placed on graphite holders prior to a heating operation.

The substrate is heated to a temperature of approximately 1200° F. and raised to approximately 1400° F. in a manner to yield a fairly uniform and intense heating of the entire substrate and holder. After a dull red heat which corresponds to the softening temperature of the glass is reached, a fine spray of tin chloride solution is immediately directed onto the heated surface.

The tin chloride solution is prepared by adding anhydrous $SnCl_4$ to a tin chloride solution. The solution contains 100 grams $SnCl_4 \cdot 5H_2O$ in 50 grams of distilled water plus 10 grams concentrated HCl and between 1.0 and 1.5 grams $SbCl_3$. Anhydrous $SnCl_4$ is added to the solution until a slight supersaturated condition is observed. Subsequently the solution was rendered slightly under saturation by the addition of an additional quantity of the first solution.

The solution is applied to the glass surface by means of a Pyrex spray gun. The spray is carried through a passage by compressed oxygen. The spray nozzle is held at a distance of approximately 4" from the glass plate, and the spray applied for 10 to 15 second intervals. In order to obtain a uniform coating, the spray is applied with a continuous horizontal and/or vertical motion. The spraying operation is repeated 4 to 10 times depending on the desired conductivity and light transmission. Between spraying a few minutes are allowed for the glass to regain its softening temperature. Subsequent to spraying, the plates are placed in an annealing furnace and allowed to cool slowly i.e. in approximately two hours to room temperature.

The coated substrates are immersed in an electrolytic solution. The electrolytic solution may comprise for example, a 0.1 N sodium chloride solution. The 0.125 N concentration represents a preferred concentration, however, the aqueous solution of sodium chloride ranged from 0.06 to 1.0 N. Other salts may also be used for forming a suitable electrolyte.

The conducting coating on the immersed layer is connected to a source of electrical energy so that it forms a cathode in the electrolytic solution. The voltage should range between 2 to 10 volts. Five volts is preferred. A current density within the range of 10 to 80 ma./cm.$^2$ and preferably about 20 ma./cm.$^2$ is maintained for a period of at least five seconds. The tin oxide is reduced to an opaque metallic tin. Preferably the substrate is immersed and subjected to the current density for about thirty seconds. At the preferred current density an adherent coating is formed. If the current density is relatively high the resulting film has poor adherence.

In some cases it has been found desirable to coat the oxide layer with a suitable photo resist such as KPR which is available from the Eastman Kodak Company. The resist coating is exposed through a mask to ultraviolet light to harden the exposed areas. The unhardened resist which covers the predetermined shapes is removed by washing intrichloroethylene. The hardened resist is then heated at an elevated temperature for about twenty minutes.

The masked substrate is immersed in the electrolytic solution and connected to a source of electrical energy. A current density of approximately 20 ma./cm.$^2$ is maintained while the conducting layer is connected as a cathode. The unmasked portion of the conducting layer is reduced to opaque tin.

In manufacturing circuits it is desirable to reduce the tin oxide slowly and then to increase the current density to thereby remove an unmasked area. Subsequently the mask, such as an emulsion mask, may be removed and portions of the remaining tin oxide may be reduced to a metal or allowed to remain as a semiconducting oxide. Areas may also be plated to form suitable circuits.

While the invention has been described in detail in connection with a preferred embodiment, it should be understood that it may be modified or embodied in other forms without departing from the scope of the appended claims.

What is claimed is:

1. Method for producing a composite article comprising the steps of providing a glass substrate, coating the substrate with a tin oxide conducting layer, placing the coated substrate in an electrically conducting solution and reducing the coating thereon to an opaque layer.

2. A method for producing a composite article according to claim 1 which comprises the additional step of masking predetermined areas of the tin oxide coating and exposing the unmasked areas of the tin oxide coating to the solution until the unmasked areas of the tin oxide coating are reduced to an opaque color.

3. Method for producing a composite article comprising the steps of providing a transparent glass substrate, coating the substrate with a transparent conductive layer of tin oxide, placing the coated substrate in an electrolytic solution, and reducing the tin oxide to an opaque color.

4. A method for producing a composite article comprising the steps of providing a glass substrate, spraying the substrate with a solution containing tin chloride, firing the sprayed substrate to thereby form a conducting tin oxide coating on one surface of the substrate, placing the coated substrate in an electrolytic solution and reducing the tin oxide coating to an opaque layer.

5. The method for producing a composite article comprising the steps of providing a glass substrate, coating the substrate with a transparent conducting layer of tin oxide, placing the coated substrate in an aqueous electrolytic solution and reducing the tin oxide layer to an opaque metal film.

6. The method for producing a composite article comprising the steps of providing a glass substrate, coating the substrate with a transparent conducting layer of tin oxide, placing the coated substrate in an electrolytic solution, connecting the conducting layer as a cathode to a source of electricity and reducing the tin oxide to an opaque layer of metallic tin.

7. A method for producing a composite article according to claim 6 in which the current density in the electrolytic solution is maintained within the range of 10 to 80 ma./cm.$^2$.

8. A method for producing a composite article in accordance with claim 7 in which the electrolytic solution consists essentially of sodium chloride, the electrolytic solution being maintained at a normality within the range of 0.06 N–1.0 N.

9. The method for producing a composite article comprising the steps of providing a glass substrate, coating the substrate with a layer of conducting tin oxide, covering the conducting with an emulsion mask, placing the masked substrate in an electrolytic solution, and reducing the unmasked tin oxide to an opaque layer of metallic tin to thereby produce a predeterminned opaque pattern.

References Cited

UNITED STATES PATENTS

| 1,844,928 | 2/1932 | Slepian | 204—23X |
|---|---|---|---|
| 2,596,515 | 5/1952 | Watkins et al. | 204—23X |
| 2,884,313 | 4/1959 | Browne | 204—18X |
| 2,919,233 | 12/1959 | Cox | 204—38 |
| 3,039,943 | 6/1962 | Cox et al. | 204—38 |
| 3,118,788 | 1/1964 | Hensler | 204—38X |
| 3,142,562 | 7/1964 | Blake | 204—18PC |
| 3,153,113 | 10/1964 | Flanagan et al. | 204—19X |
| 3,227,633 | 1/1966 | Tokumoto et al. | 204—2 |
| 3,325,379 | 6/1967 | Bussolini et al. | 204—12 |

FOREIGN PATENTS 822,895 11/1959 Great Britain.

JOHN H. MACK, Primary Examiner

T. TUFARIELLO, Assistant Examiner

U.S. Cl. X.R.

204—15, 22, 27, 30